United States Patent [19]

Kijima et al.

[11] Patent Number: 5,133,573
[45] Date of Patent: Jul. 28, 1992

[54] STRUT MOUNTING STRUCTURE FOR A VEHICLE AND METHOD OF ASSEMBLY

[75] Inventors: Takao Kijima, Hiroshima; Akihiro Kashiwagi, Hatsukaichi, both of Japan

[73] Assignee: Mazda Motor Corporation, Hiroshima, Japan

[21] Appl. No.: 747,483

[22] Filed: Aug. 19, 1991

Related U.S. Application Data

[63] Continuation of Ser. No. 498,581, Mar. 26, 1990, abandoned.

[30] Foreign Application Priority Data

Mar. 27, 1989 [JP] Japan ................................ 1-75503

[51] Int. Cl.⁵ ............................................. B60G 11/58
[52] U.S. Cl. .................................... 280/697; 267/220; 267/33
[58] Field of Search ............... 267/220, 33, 275, 279, 267/280, 285; 280/668, 688, 673, 695, 701, 711, 712; 188/322.11, 322.12, 321.11

[56] References Cited

U.S. PATENT DOCUMENTS

| | | | |
|---|---|---|---|
| Re. 31,184 | 3/1983 | Lederman | 280/668 |
| 4,256,292 | 3/1981 | Sullivan, Jr. et al. | 267/220 |
| 4,462,608 | 7/1984 | Lejerman | 267/33 |
| 4,565,389 | 1/1986 | Kami et al. | 280/688 |
| 4,673,192 | 6/1987 | Krehan et al. | 267/220 |
| 4,706,987 | 11/1987 | Pettibone et al. | 280/688 |
| 4,721,325 | 1/1988 | Mackovjak et al. | 267/33 |
| 4,793,597 | 12/1988 | Smith | 267/33 |
| 4,802,688 | 2/1989 | Murakami et al. | 280/668 |
| 4,810,003 | 3/1989 | Pinch et al. | 267/33 |
| 4,944,524 | 7/1990 | Achevbach | 280/688 |

FOREIGN PATENT DOCUMENTS

| | | | |
|---|---|---|---|
| 2630462 | 1/1978 | Fed. Rep. of Germany | 188/321.11 |
| 2535259 | 5/1984 | France | 280/668 |
| 58-105810 | 6/1983 | Japan | 267/33 |
| 1-255732 | 10/1989 | Japan | 267/220 |
| 2100201 | 12/1982 | United Kingdom | 280/668 |

*Primary Examiner*—Charles A. Marmor
*Assistant Examiner*—Karin Tyson
*Attorney, Agent, or Firm*—Fleit, Jacobson, Cohn, Price, Holman & Stern

[57] ABSTRACT

An upper part of a strut is attached throught a rubber bushing to a body side member, and an upper spring sheet is attached to a lower surface of the rubber bushing. By this arrangement, in the loaded condition, the rubber bushing is compressed by the coil spring force so that comfort of ride and cornering stability are improved.

7 Claims, 5 Drawing Sheets

STRUT MOUNTING STRUCTURE FOR A VEHICLE AND METHOD OF ASSEMBLY

This is a continuation of application Ser. No. 07/498,581, filed Mar. 26, 1990, now abandoned.

BACKGROUND OF THE INVENTION

1. Field of the Invention

This invention relates to a suspension system for vehicles and, more particularly, a strut mounting structure.

2. Description of the Prior Art

In general, in a vehicle suspension system, a strut device comprising a damper member and a spring member is arranged between a wheel support member and a body side member for controlling the oscillation of a wheel of the vehicle.

FIG. 6 shows a well known strut mounting structure. In FIG. 6, a lower part 51 of a strut is connected to a wheel support member. A first rubber bushing 53 connects an upper part 52 of the strut to the body side member 54. A lower spring seal 56 connected to the lower part 51 of the strut supports a lower part of a coil spring 55 located around the strut. An upper spring seal 58 connected to a second rubber bushing 57 supports an upper part of the coil spring 55. The first rubber bushing is supported by a case 60 bolted to the body side member 54.

The compressibility (hardness) of the first rubber bushing 53 is usually arranged in accordance with a non-loaded condition of the vehicle. When the wheel is bumped in a loaded condition, the strut generates a clamping force in the same way as in the non-loaded condition. That is, first the rubber bushing 53 deforms, and then the strut generates a damping force, after some delay. This delay or damping timing does not spoil the comfort of a ride and cornering stability in the non-loaded condition, since the suspension is moved through relatively small oscillations due to the light weight of the vehicle. However, in a loaded condition, the suspension tends to move through great oscillations due to the heavy weight of the vehicle in the loaded condition. During the delay in the damping timing, in other words, a predetermined time until the damping force acts against suspension movement, the suspension is free to oscillate. Therefore, this predetermined delay of damping timing badly affects the vehicle as the amount of weight in the loaded condition increases, because a great oscillation will occur before the damper acts in the loaded condition.

SUMMARY OF THE INVENTION

The present invention has its object to improve the comfort in ride and cornering stability of a vehicle by making a damping timing variable in accordance with a loaded condition, and more specifically, making the damping timing in a loaded condition sooner than that of a non-loaded condition.

In order to attain the above object, the present invention provides a damper member, a lower part of which is connected to a wheel support member and an upper part of which is connected to a body side member and a coil spring located around the upper part with upper and lower spring seals supporting the coil spring, and a rubber bushing connecting the upper part of the damper member to a body side member. The upper spring seal is connected to the rubber bushing.

By this arrangement, in the loaded condition of a vehicle, the rubber bushing is compressed by the force of the coil spring. As a result, when the suspension is bumped, the damper member generates a damping force sooner than in a non-loaded condition. A comfortable ride and cornering stability are thereby improved.

On the other hand, in the non-loaded condition, the rubber bushing is not compressed. An additional advantage is achieved by the arrangement of the invention in that in the non-loaded condition vibration from the vehicle is only slightly translated to the body member.

Furthermore, when the compressed damper member strut is compressed by more than a predetermined amount, the upper part of the damper member is tightly connected through a rubber bushing to the body side member. Stability of the vehicle is improved independent of the compression condition of the bushing.

BRIEF DESCRIPTION OF THE DRAWINGS

The attached drawings show preferred embodiments of the present invention, in which:

FIG. 1 is a front view, partially broken away, of the whole composition of a suspension system.

FIG. 2 is a side view, in longitudinal section, of a strut.

FIG. 3 is an exploded side view, in longitudinal section of a strut.

FIG. 4 is a horizontal view of the strut of the second embodiment.

FIG. 5 is a side view in longitudinal section of FIG. 4.

DETAILED DESCRIPTION OF THE PREFERRED EMBODIMENTS

A description is made below of the preferred embodiments of the present invention, with reference to the accompanying drawings.

Figure 1:
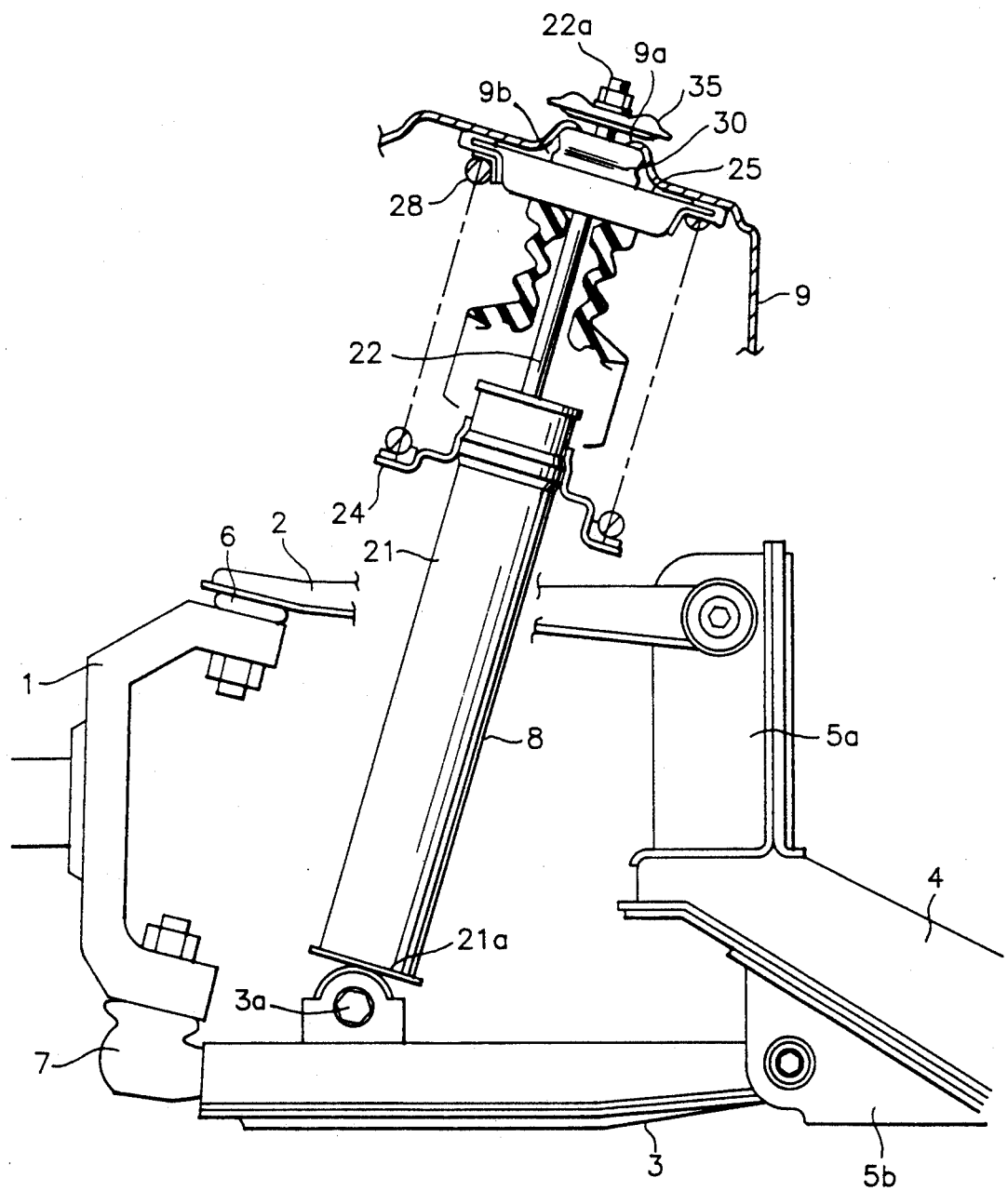
FIGS. 1 to 3 show the first embodiment of the present invention.
Figure 2:
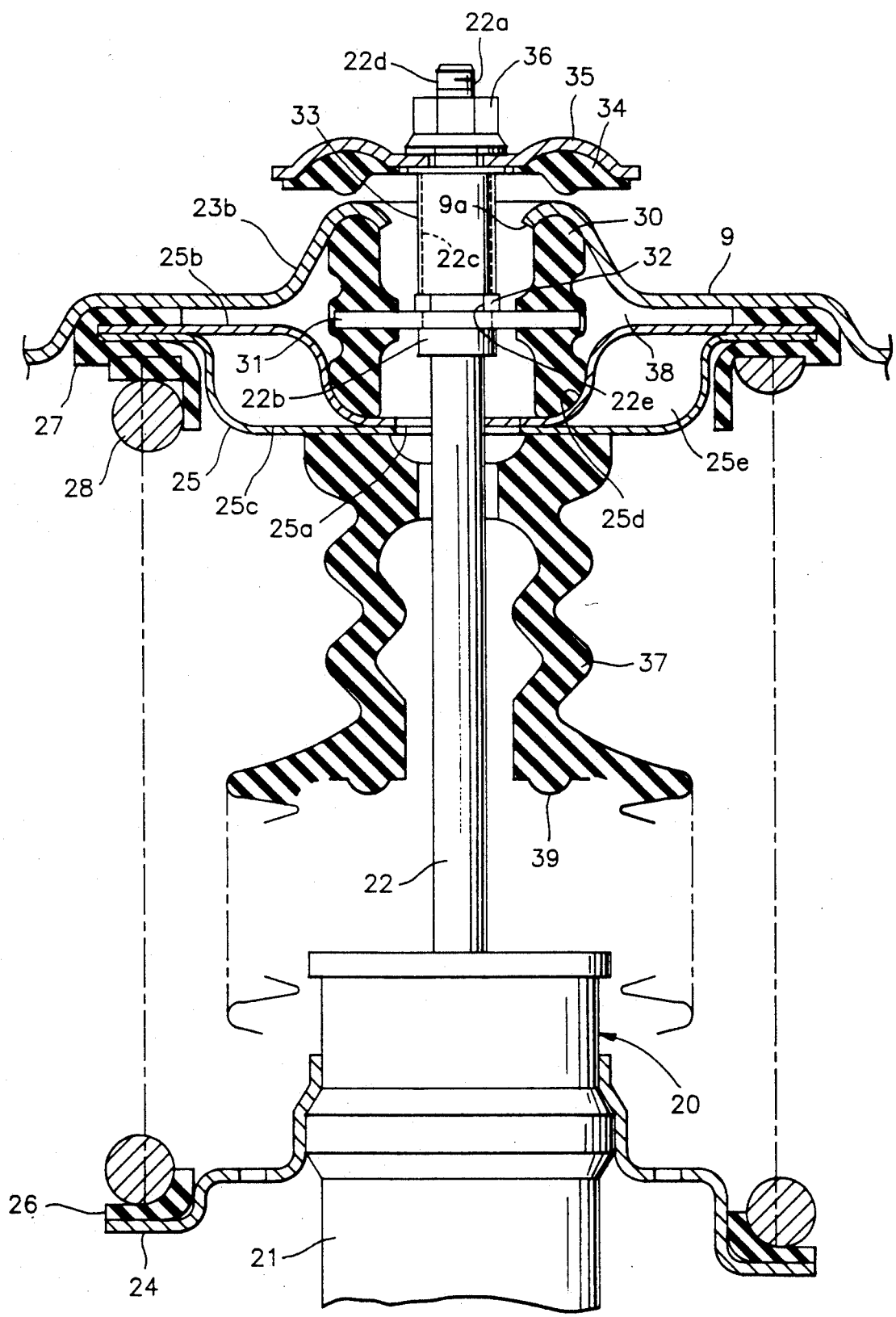
Figure 3:
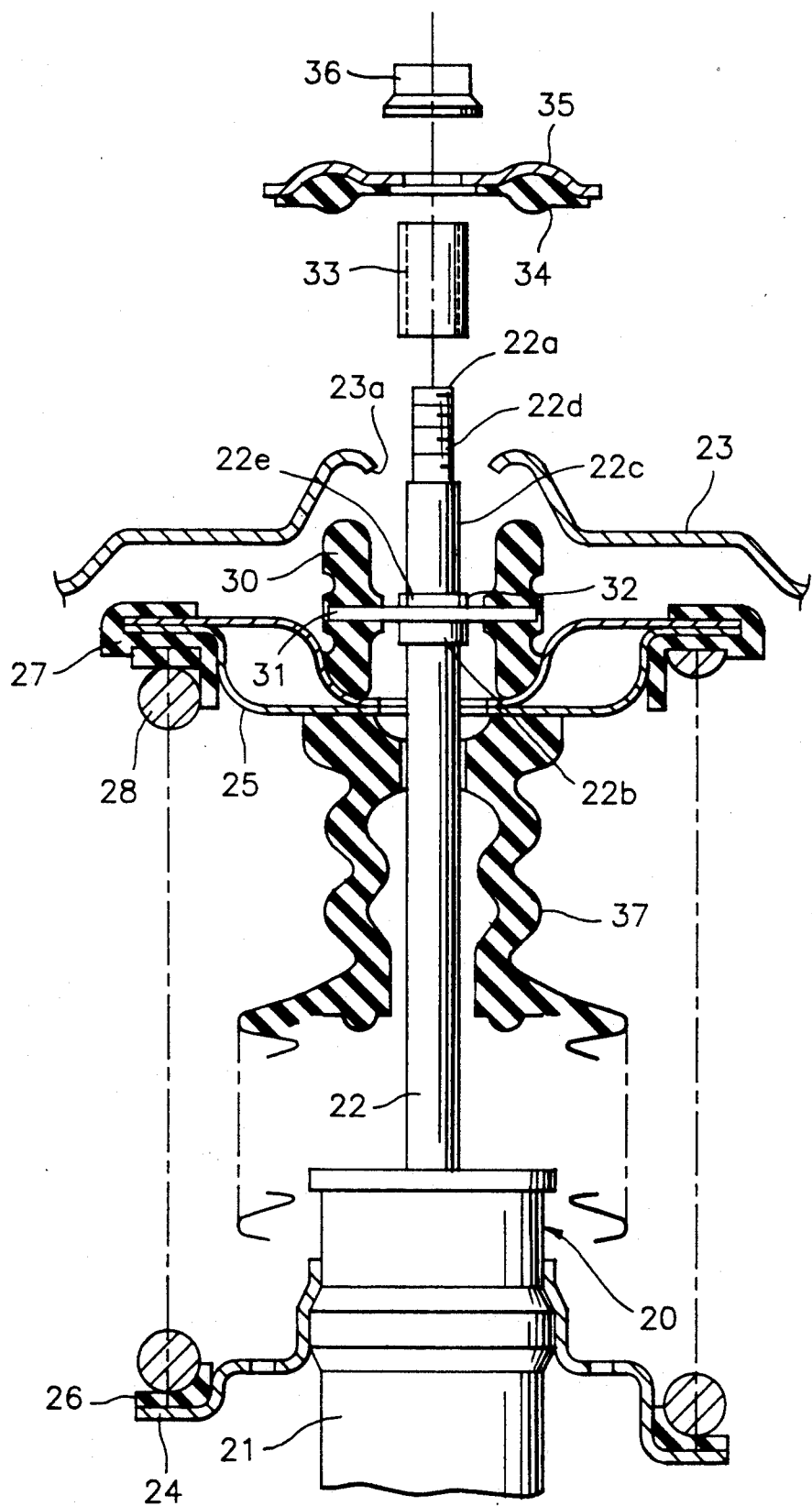

FIGS. 1 to 3 show a strut mounting structure for a vehicle according to the first embodiment of the present invention.

In FIG. 1, reference numeral 1 designates a wheel support member which rotatably supports a wheel (not shown in the drawing).

Reference numerals 2 and 3 designate an upper arm and a lower arm, respectively, each comprising an "A" type arm arranged in a width direction of a vehicle, while an inner end portion of each of the arms 2, 3 is connected for up and down swinging to a cross-member 4, which is strengthened by brackets 5a, 5b. Outer end portions of brackets 5a, 5b are connected to an upper part and a lower part of the wheel support member 1 by ball joints 6, 7.

Reference numeral 8 designates a strut arranged substantially in a vertical direction between the lower arm 3 of wheel support member 1 and a body panel 9 of a vehicle.

In FIG. 2 the strut 8 comprises a cylinder 21 and a piston rod 22. A lower part 21a of the cylinder 21 is pivotally connected to a lower arm 3 by bolt 3a and an upper part of the piston rod 22a is connected to the body panel 9. The body panel has a hole 9a through which the upper part 22a of the piston rod 22 extends, and an upwardly extending projection 9b is formed around the hole 9a.

The cylinder 21 supports a lower spring seat 24. An upper spring seat 25 is located below the body panel 9. The upper spring sheet 25 has a hole 25a through which the upper part of the piston rod 22a extends.

A lower rubber seat 26 supporting a lower end of a coil spring 28 is attached to an upper- surface of the lower spring seat 24. An upper rubber seat 27 supporting an upper end of the coil spring 28 is attached about an edge portion of the upper spring seat 25. The coil spring 28, supported by the lower rubber seat 26 and the lower spring seat 24, pushes up the upper rubber seat 27 to a lower surface of the body panel 9.

The upper spring seat 25 is composed of an upper panel 25b and a lower panel 25c. A center portion of the upper panel 25b includes a downwardly extending recess 25d. Around the recess 25d, the upper panel 25b and the lower panel 25c form a closed cross-section chamber 25e.

In a space formed between the projection 9b of the body panel 9 and the recess 25d of the upper spring sheet 25, is located a cylindrical rubber bushing 30. An upper part of the rubber bushing 30 is attached to the projection 9b of the body panel 9 and a lower part of the rubber bushing 30 is attached to the recess 25d of the upper panel 25b of the upper spring seat 25. The rubber bushing 30 is compressed by force of the coil spring 28 transmitted through the upper spring seat 25 because the upper rubber seat 27 is soft enough to allow the rubber bushing 30 to compress slightly. A ring plate 31 is molded into a central portion of the rubber bushing 30 and extends normally to the axis of the rubber bushing 30.

In FIG. 3, the upper part of the piston rod 22a comprises a thickened section 22b, a portion 22c of lesser diameter than portion 22b and a threaded portion 22d of lesser diameter than section 22c. A groove 22e for a snap ring 32 is formed in a lower part of the portion 22c. The ring plate 31 is attached to an upper part of portion 22c, and is held between the portion 22b and snap ring 32 attached in the groove 22e of portion 22c. A sleeve 33 is attached tightly around the portion 22c. A rubber bracket 35 holding a stop rubber 34 is attached around the threaded portion 22d and is secured by a nut 36.

Reference numeral 37 designates a dust cover of a bellows shape located between the upper spring seat 25 and the lower spring seat 24. The dust cover 37 has a stopper 39 at a lower portion.

By the above arrangement, in a loaded condition, a coil spring force transmitted through the upper spring seat 25 compresses the rubber bushing 30.

In the loaded condition in which the tensed strut 8 is compressed, since the rubber bushing 30 is compressed during the loaded condition, a damping force of the strut 8 is achieved sooner than in an un-loaded condition, whereby the suspension is prevented from greatly oscillating. A comfortable ride and cornering stability are thereby improved.

In the condition in which the compressed strut 8 is tensed whether loaded or not, the compressed rubber bushing 30 holds the piston rod 22 of the strut 20 tightly and a feeling of stability is improved.

The rubber bushing 30, the body panel 9 and the upper spring seat 25 compose a closed space 38 functioning as an air spring.

An assembling of the above arrangement is described below in accordance with FIG. 3.

1. The coil spring 28 and the dust cover 37 are located around the cylinder 21 and the piston rod 22 with the lower end of the coil spring located on the lower rubber seat 26 and the lower spring seat 24.

2. The upper spring seat 25 is placed on the piston rod 22 through a hole 25a to rest on the upper end of the coil spring 28.

3. The ring plate 31 with the bushing 30 is attached to portion 22c of the piston rod 22.

4. The snap ring 32 is located in the groove 22e. A sub-assembly of the strut 8 is thereby completed.

5. The upper part 22a of the piston rod 22 is positioned to extend through the hole 9a of the body panel 9.

6. The sleeve 33 is located around the portion 22c.

7. The rubber bracket 35 is positioned around the threaded portion 22d and secured by nut 36.

The strut 8 is thereby easily assembled on the wheel support member.

Figure 4:
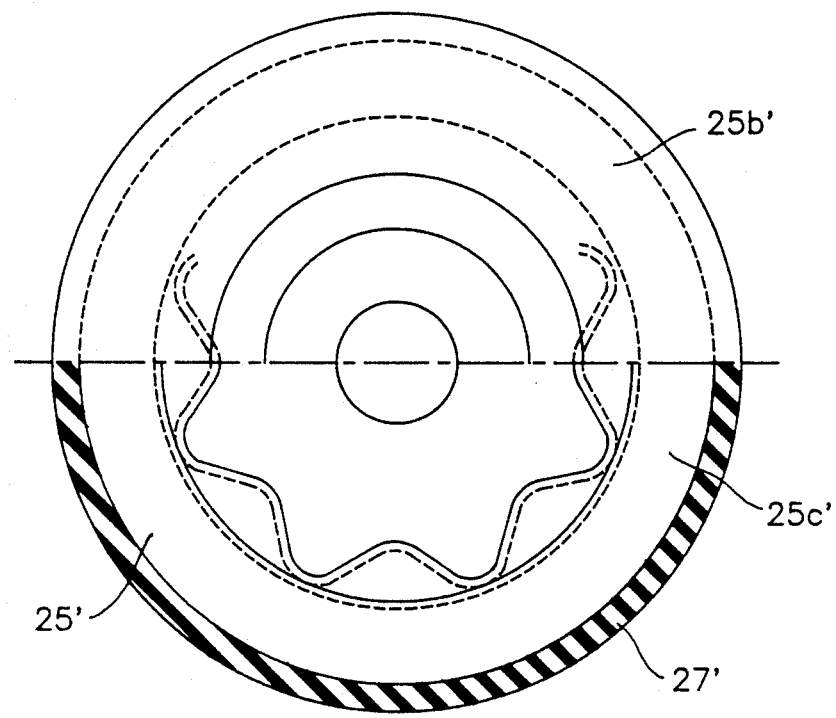
FIGS. 4 and 5 show the second embodiment of the present invention.
Figure 5:
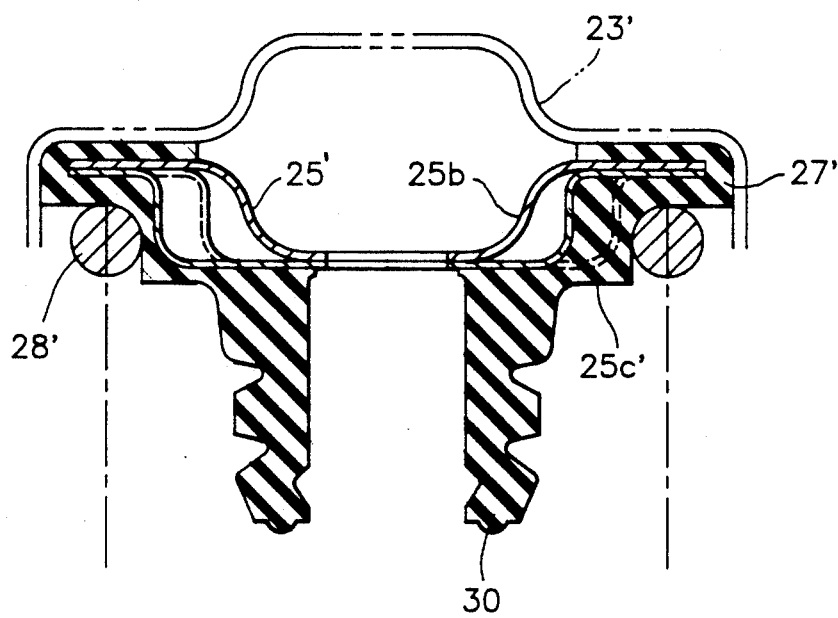
Figure 6:
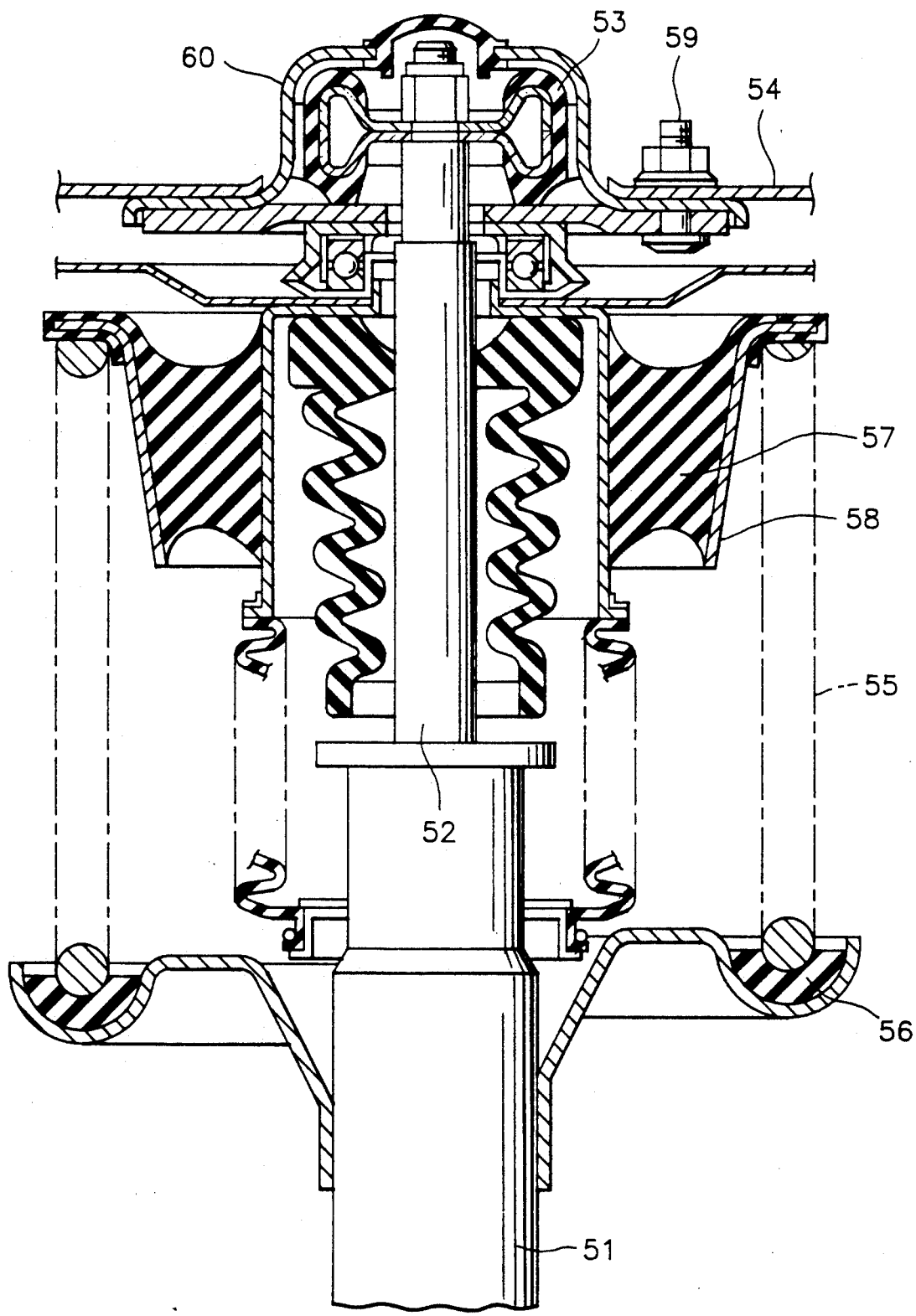
FIG. 6 is a side view in longitudinal section of a known strut.

FIGS. 4 and 5 show a modified example of the upper spring seat 25 and the upper rubber seat 27. The modified example 25' of the upper spring seat 25 is attached to a body panel 23'.

The lower panel 25c' of the upper spring seat 25' is made to have an undulating shape to improve the stiffness of the upper spring seat 25'. The upper spring seat 25' also includes an upper panel 25b'.

The upper rubber seat 27', against which the coil spring 28' abuts, is extended so that a lower part of the upper rubber sheet 27' includes a stopper 30'. The stopper 30' touches the upper part of the cylinder 21 when the strut 8 is compressed.

The air spring composed of the closed space 38 prevents the rubber bushing 30 from completely being compressed so as to absorb an abrupt compression force experienced when, for example, a stone is on, the road, even if the vehicle is in a loaded condition. The elastic character of the air spring is non-linear and its elastic coefficient becomes large as it is compressed. Therefore, the air spring becomes more important as the load on the vehicle increases. The air spring can thereby compensate for the deficiency of the rubber bushing in its softness in a loaded condition.

Further, the closed cross-section part 25e is rigid enough to transmit a spring force directly to the rubber bushing 30 without increasing the weight of the vehicle.

We claim:

1. The combination of a vehicle, a strut comprised of a piston cylinder having a projecting piston rod, and a strut mounting structure for mounting the strut, extending substantially vertically with the piston cylinder at the bottom and the piston rod at the top, on the vehicle, said vehicle having a body panel, said strut mounting structure comprising:

a coil spring surrounding the strut;

a lower coil spring supporting means mounted on the cylinder and supporting the lower end of the coil spring;

an upper coil spring supporting means for supporting the upper end of the coil spring in a spaced relationship from said body panel;

a rubber bushing surrounding said piston rod and bearing at one end against said body panel and at its other end against said upper coil spring supporting means, said one end of the rubber bushing contacting the body panel around a hole defined in the body panel;

an upper rubber seat interposed in the space defined between the body panel and the upper coil spring supporting means, the rubber bushing, the upper coil spring supporting means, the upper rubber seat and the body panel defining an enclosed space forming an air spring; and connecting means for connecting said rubber bushing to the piston rod of the strut so that in a loaded condition of the vehicle, the rubber bushing is being compresses by the coil spring acting through the upper coil spring supporting means to effect a quicker generation of a damping force responsive to a bump.

2. The combination of claim 1 wherein said upper one end of the rubber bushing contacts the body panel around a hole defined in the body panel.

3. The combination of claim 2, wherein an upper rubber seat is interposed in the space defined between the body panel and the upper coil spring supporting means.

4. The combination of claim 1, wherein a rubber bracket is attached to the piston rod and contacts an upper surface of the body panel.

5. The combination of claim 1, wherein the upper coil spring supporting means includes an upper panel and a lower panel, the upper panel and the lower panel forming a closed section.

6. The combination of claim 1, and further including means mutually cooperating with the upper coil spring supporting means and the body panel to form a closed space air spring.

7. The combination of claim 1, wherein the connecting means includes a ring plate is molded into a central portion of the rubber bushing.

* * * * *